(12) United States Patent
Moyer

(10) Patent No.: US 6,185,657 B1
(45) Date of Patent: Feb. 6, 2001

(54) MULTI-WAY CACHE APPARATUS AND METHOD

(75) Inventor: William C. Moyer, Dripping Springs, TX (US)

(73) Assignee: Motorola Inc., Schaumburg, IL (US)

( * ) Notice: Under 35 U.S.C. 154(b), the term of this patent shall be extended for 0 days.

(21) Appl. No.: 09/062,571

(22) Filed: Apr. 20, 1998

(51) Int. Cl.$^7$ .................................................. G06F 12/08
(52) U.S. Cl. ............................................. 711/128; 711/154
(58) Field of Search .................... 711/133–136, 144–145, 711/154, 159–160, 163, 128

(56) References Cited

U.S. PATENT DOCUMENTS

| 5,410,669 | 4/1995 | Biggs et al. | 711/118 |
| 5,553,262 | 9/1996 | Ishida et al. | 711/123 |
| 5,682,515 | 10/1997 | Lau et al. | 711/118 |

FOREIGN PATENT DOCUMENTS 2317 976   4/1998   (GB) .

OTHER PUBLICATIONS

European Search Report, EP 99 10 7273.
Motorola Inc., "MC88110 Second Generation RISC Microprocessor User's Manual", Section 6, pp. 6–1 through 6–46 (1991).*

* cited by examiner

*Primary Examiner*—John W. Cabeca
*Assistant Examiner*—Denise Tran

(57) ABSTRACT

Apparatus having a multi-way cache (18), the apparatus including a first user controllable element (102, 104, or 106) having a predetermined first attribute corresponding to a first way of the multi-way cache; a second user controllable element (102, 104, or 106) having a predetermined second attribute corresponding to a second way of the multi-way cache; a conductor (87) for transferring an access attribute to the multi-way cache; first compare circuitry (60) which compares the access attribute to the predetermined first attribute to provide a first comparison result; second compare circuitry (60) which compares the access attribute to the predetermined second attribute to provide a second comparison result; first way control circuitry (92) for selectively enabling the first way of the multi-way cache based on the first comparison result; and second way control circuitry (92) for selectively enabling the second way of the multi-way cache based on the second comparison result.

22 Claims, 5 Drawing Sheets

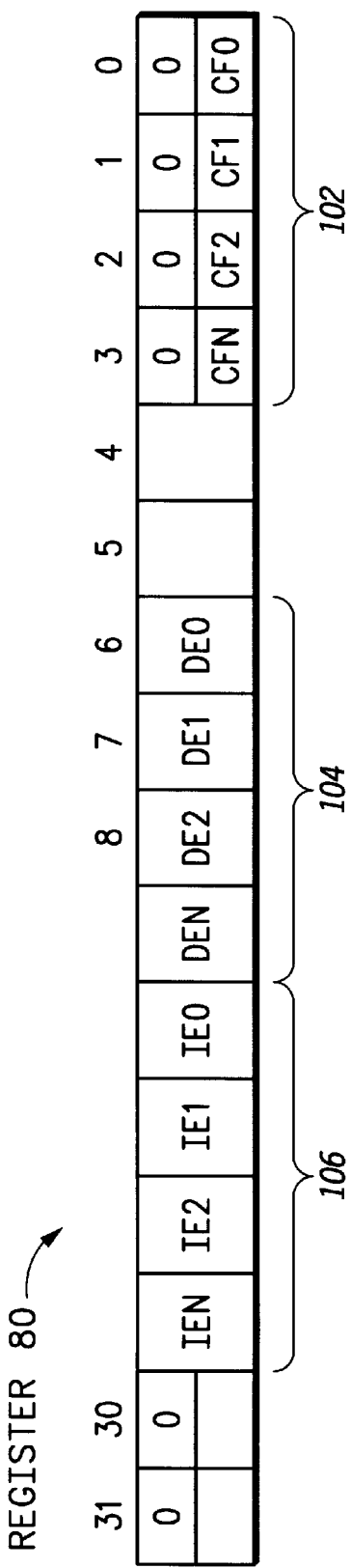

CFx — CACHE FLUSH FOR WAY x
THIS WRITE-ONLY BIT, WHEN WRITTEN TO A LOGICAL 1, WILL CAUSE ALL ENTRIES IN THIS WAY OF THE CACHE TO BE INVALIDATED.

IEx — INSTRUCTION CACHING ENABLE FOR WAY x
INSTRUCTION CACHING ENABLE BIT. ON RESET, THIS BIT IS CLEARED.
 0 = DISABLE INSTRUCTION CACHING FOR THIS WAY.
 1 = ENSABLE INSTRUCTION CACHING FOR THIS WAY.

DE — DATA CACHING ENABLE FOR WAY x
DATA CACHING ENABLE BIT. ON RESET, THIS BIT IS CLEARED.
 0 = DISABLE DATA CACHING FOR THIS WAY.
 1 = ENSABLE DATA CACHING FOR THIS WAY.

FIG. 4

MULTI-WAY CACHE APPARATUS AND METHOD

FIELD OF THE INVENTION

The present invention relates generally to processors and memory, and more particularly to multi-way cache memory.

BACKGROUND OF THE INVENTION

Lower power consumption has been gaining importance in microprocessor and microcontroller design due to wide spread use of portable and handheld applications. A typical embedded control system will generally include a central processing unit (CPU) and a variety of different types of memory and peripheral devices. The different types of memory may be external to an integrated circuit having the microcontroller, and/or on the same integrated circuit, and may include cache memory, ROM (read only memory), and a variety of SRAM (static random access memory) devices.

A significant amount of energy and time is required to access a large external main memory. Therefore, a smaller, faster, and more efficient memory, sometimes referred to as a cache, may be used on the integrated circuit to reduce the number of accesses to the main memory. To keep the size of the integrated circuit as small as possible, only as much memory as is necessary is included onboard the integrated circuit.

A cache TAG is frequently used to increase the performance of the cache. The cache TAG receives a TAG address that is provided by the microprocessor and determines if the requested instructions and/or data are present in the cache memory. If a requested instruction is not located in the cache, the microprocessor must then retrieve the instruction from the main memory. When an instruction is written into the cache, the higher order bits of the address of the instruction are stored in a TAG array. The cache TAG also has a comparator that compares a processor generated address to the TAG address. If the TAG address and the processor generated address are the same, a cache "hit" occurs, and a match signal is provided by the cache TAG, indicating that the requested data is located in the cache memory. If the processor generated address and the TAG address are not the same, a cache "miss" occurs, and the match signal indicates that the requested data is not located in the cache memory. In addition, a valid bit may be set as a part of the TAG address for qualifying a valid hit of the stored TAG address during a compare cycle of the cache.

With conventional cache approaches, in many applications, cache efficiency may be negatively affected by conflicting access requirements leading to many cache misses and external memory accesses. In addition, in low power applications, a premium is placed on efficient power management for processing resources. It would be desirable for a cache memory to provide increased processing efficiency, e.g. higher cache hit rates, combined with lower power consumption.

Accordingly, there is a need for an improved cache apparatus and method.

BRIEF DESCRIPTION OF THE DRAWINGS

While the invention is pointed out with particularity in the appended claims, other features of the invention are disclosed by the following detailed description taken in conjunction with the accompanying drawings, in which:

FIG. 4 is a general diagram that illustrating a particular embodiment of the register for use in connection with the cache of FIG. 2.

DETAILED DESCRIPTION OF THE PREFERRED EMBODIMENTS(S)

Figure 1:
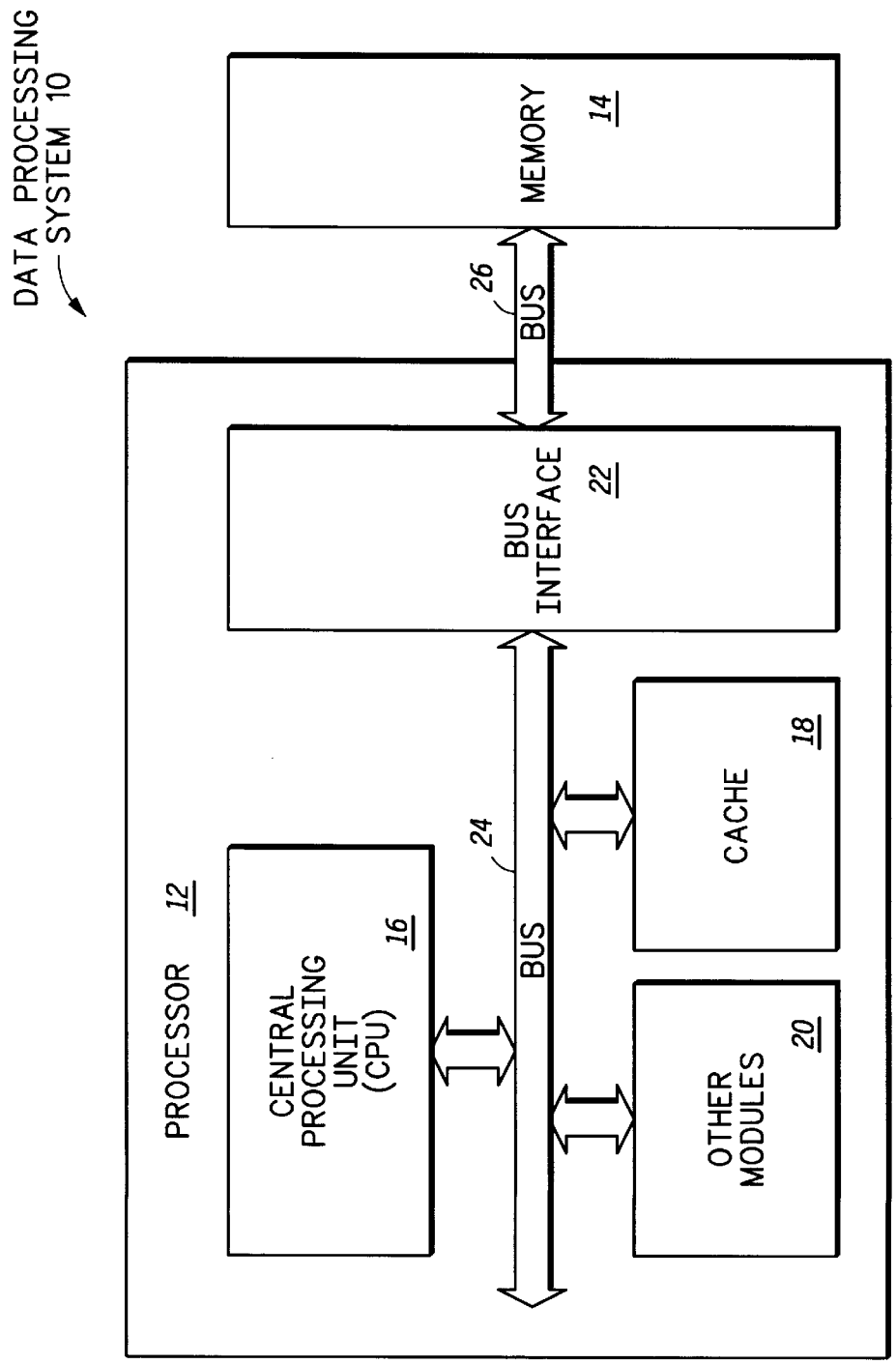
FIG. 1 is a block diagram of an embodiment of a data processing system.

Generally, the present invention relates to multi-way cache apparatus and methods of using multi-way cache. In accordance with a first aspect of the present invention, the apparatus is an apparatus having a multi-way cache. The apparatus includes a first user controllable element having a predetermined first attribute corresponding to a first way of the multi-way cache; a second user controllable element having a predetermined second attribute corresponding to a second way of the multi-way cache; a conductor for transferring an access attribute to the multi-way cache; first compare circuitry which compares the access attribute to the predetermined first attribute to provide a first comparison result; second compare circuitry which compares the access attribute to the predetermined second attribute to provide a second comparison result; first way control circuitry for selectively enabling the first way of the multiway cache based on the first comparison result; and second way control circuitry for selectively enabling the second way of the multi-way cache based on the second comparison result.

In accordance with another aspect of the present invention, the apparatus is an integrated circuit. The integrated circuit includes a cache having a first way and a second way; a first storage element for storing a first stored attribute for the first way of the cache; a second storage element for storing a second stored attribute for the second way of the cache; a conductor for transferring an access attribute; and control circuitry. The control circuitry compares the access attribute to the first stored attribute to provide a first comparison result and selectively enables the first way of the cache based on the first comparison result. The control circuitry also compares the access attribute to the second stored attribute to provide a second comparison result and selectively enables the second way of the cache based on the second comparison result.

In accordance with another aspect of the present invention, a method for operating a data processing system having a multi-way cache is disclosed. The method includes the steps of initiating an access operation; accessing the multi-way cache in response to the access operation; providing a provided access attribute to the multi-way cache as part of the access operation; comparing the provided access attribute with a first stored access attribute that corresponds to a first way of the multi-way cache; comparing the provided access attribute with a second stored access attribute that corresponds to a second way of the multi-way cache; selectively enabling the first way of the multi-way cache based on whether the provided access attribute matches the first stored access attribute; and selectively enabling the second way of the multi-way cache based on whether the provided access attribute matches the second stored access attribute.

It should be noted that the particular terms and expressions employed and the particular structural and operational details disclosed in the detailed description and accompanying drawings are for illustrative purposes only and are not intended to in any way limit the scope of the invention as described in the appended claims.

Referring to FIG. 1, an embodiment of a processing system 10 is illustrated. The processing system 10 includes a processor 12, and an external memory 14. The processor 12 includes a central processing unit 16, a cache memory 18, a bus interface 22, and other modules 20. The processor 12 also includes bus 24 and bus 26. The bus 24 interconnects the CPU 16, the cache 18, the bus interface 22, and the other modules 20. The bus 26 couples the bus interface 22 to the memory 14. While a specific exemplary embodiment of data processing system 10 has been disclosed, it is contemplated that various configurations and alternative embodiments of such a processing system could be implemented. For example, while the cache 18 has been shown as part of the processor 12, the cache could alternatively been disposed outside of the processor 12, such as within the external memory 14.

Figure 2:
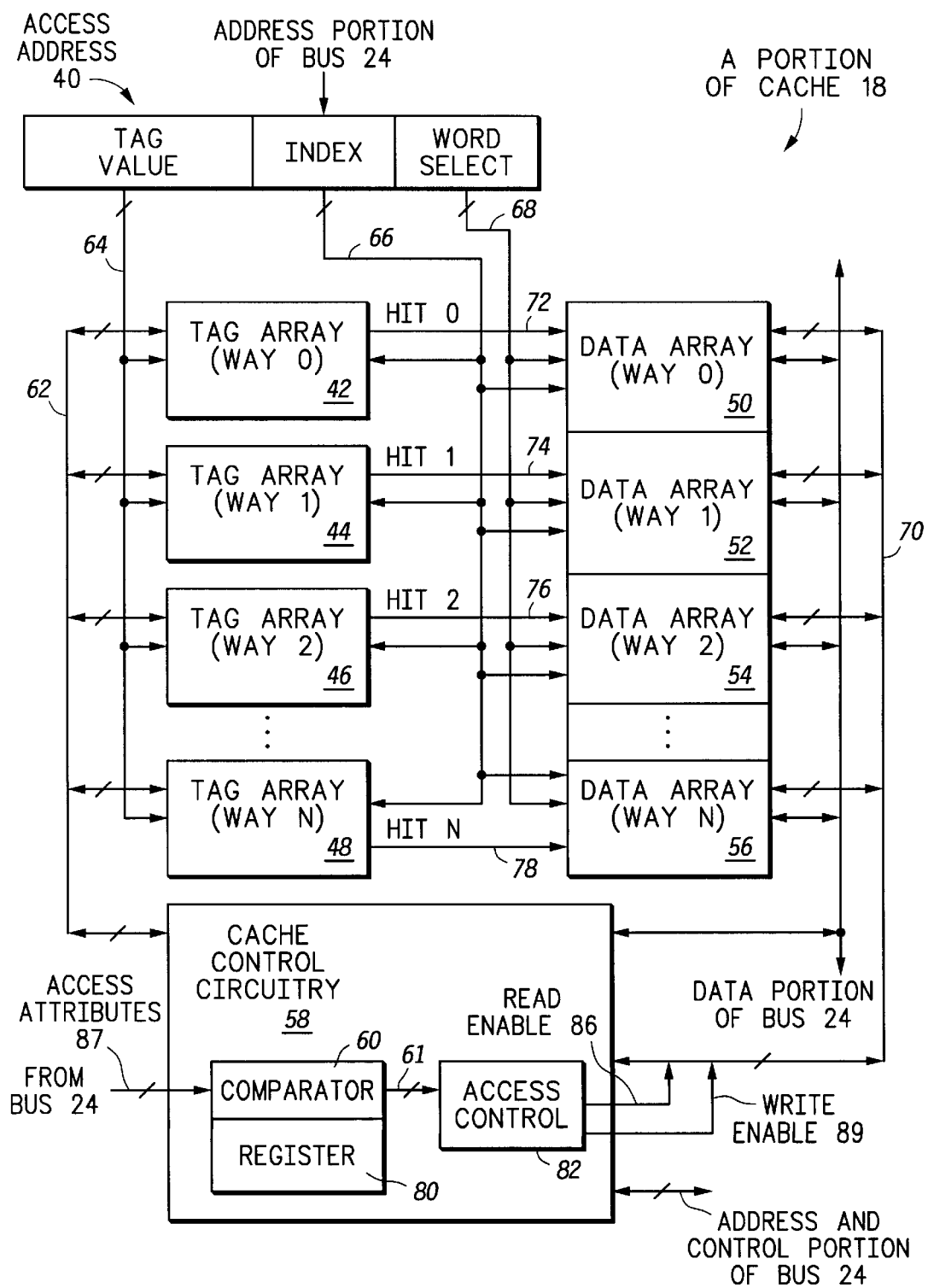
FIG. 2 is a block diagram of an embodiment of a portion of the cache of FIG. 1.

Referring to FIG. 2, a particular embodiment of a portion of the cache 18 is disclosed. The portion of the cache 18 includes a register 40, tag memory array for multiple ways 42–48, data memory array for multiple ways 50–56, and cache control circuitry 58. The cache control circuitry 58 includes register 80, comparator 60, and access control logic 82. The register 40 receives an address portion of the bus 24 and has a tag value portion 64, and index portion 66, and a word select portion 68. The tag portion 64 includes tag value data that is provided to the multi-way tag array 42–48. Data from the index portion 66 is provided to both the multi-way tag array 42–48 and to the multi-way data array 50–56. Data from the word select portion 68 is provided to the multi-way data array 50–56. The multi-way data array is coupled to a bidirectional data portion of the bus 24.

Each tag array, such as tag array (way 0) 42 provides a hit signal to a corresponding data array, such as data array (way 0) 50 based on a comparison between tag value 64 and data located with respect to index value 66. The cache control circuitry 58 receives access attributes 87, address, and control data from bus 24. In an alternative embodiment, access attributes 87 may be generated locally, such as from within the multi-way cache 18. The comparator 60 is used to compare the access attributes 87 with stored attribute values from register 80 to produce a comparison result 61 which is in turn processed by access control logic 82 to generate read enable signals 86 and write enable signals 89 for each of the plurality of cache ways. Although only a single comparator 60 is illustrated, comparator 60 includes a plurality of individual comparators for each of the plurality of cache ways. In a particular embodiment, the access attributes includes data class types for accessed information, such an instruction type or a data type of information stored in memory. The register 80 in this embodiment includes control bits corresponding to enable or disable for each of the data class types. In addition, the register 80 may include other control bits to select various functions enabled or disabled for each of the plurality of cache ways. An example of such additional control bits is control bits to selectively enable cache flushing on a per way basis. In addition, the cache control circuitry communicates with the tag array 42–48 and the data array 50–56 via respective communication paths 62 and 70.

The cache control circuitry 58 is responsive to data received from the data bus 24. For example, a user programmable control word that contains user selected attribute control bits for a plurality of cache ways may be received from data bus 24 and stored in the register 80. In this manner, the register 80 may flexibly and dynamically allocate multi-way cache memory resources based on specific application or user needs.

Figure 3:
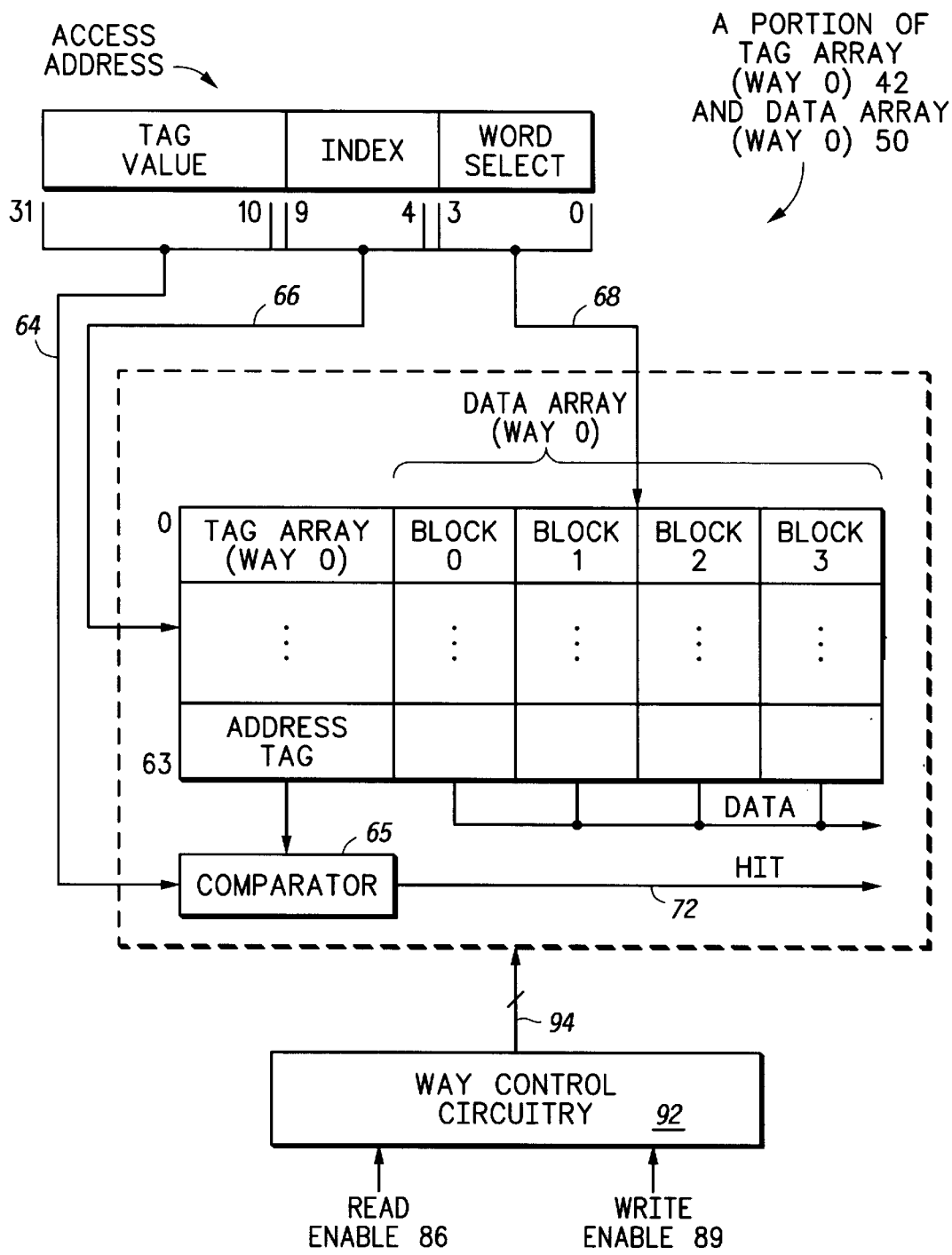
FIG. 3 is block diagram of a particular embodiment that more specifically illustrates the cache of FIG. 2.

Referring to FIG. 3, a specific embodiment of a portion of first tag array way, such as the tag array (way 0) 42 and a portion of a corresponding first data array way, such as the data array (way 0) 50 is illustrated. The above described portion includes the register 40 having the tag portion 64, index portion 66, and word select portion 68. The tag portion 64 is compared using comparator 65 with a value retrieved from the tag array (way 0) 42 via index portion 66 to provide hit signal 72. The data array (way 0) 50 includes a plurality of data blocks and is addressed by both the index value 66 and the word select value 68. The addressed data item is output from the data array (way 0) 50 via a data bus which is a portion of bus 24.

Also disclosed is way control circuitry 92 which receives read enable signals 86 and write enable signals 89 at its input and provides a control signal 94 at its output. The control signal 94 includes read and write control signals for both the tag array (way 0) 42 and the data array (way 0) 50 as well as other associated control signals for functions to be performed or not performed on a per way basis.

Referring to FIG. 4, a particular exemplary embodiment of register 80 within the cache control circuitry 58 is illustrated. In this embodiment, the register 80 includes a plurality of data fields, each field including a plurality of data bits. The register 80 includes a cache flush field 102, a data caching enable field 104, and an instruction caching enable field 106.

Each of the fields 102–106 may include one or more control bits. The cache control bits of field 102 are each associated with a different cache way. For each cache way, a particular cache control bit within field 102 will determine whether that particular cache way is flushed or cleared. When the particular cache way is flushed, all data within the data array for such way is invalidated.

For each cache way, a particular cache control bit within field 104 will determine whether that particular cache way can be used to access data having a data class type. Similarly, for each cache way, a particular cache control bit within field 106 will determine whether that particular cache way can be used to access data having an instruction class type. While only the class types of data and instruction type have been disclosed, it is contemplated that the above per way method and structure is applicable to a variety of data classes. For example, other control fields may be used for alternate data class type definitions, such as a user class type, supervisor class type, stack data class type, and non-stack data class type.

Figure 5:
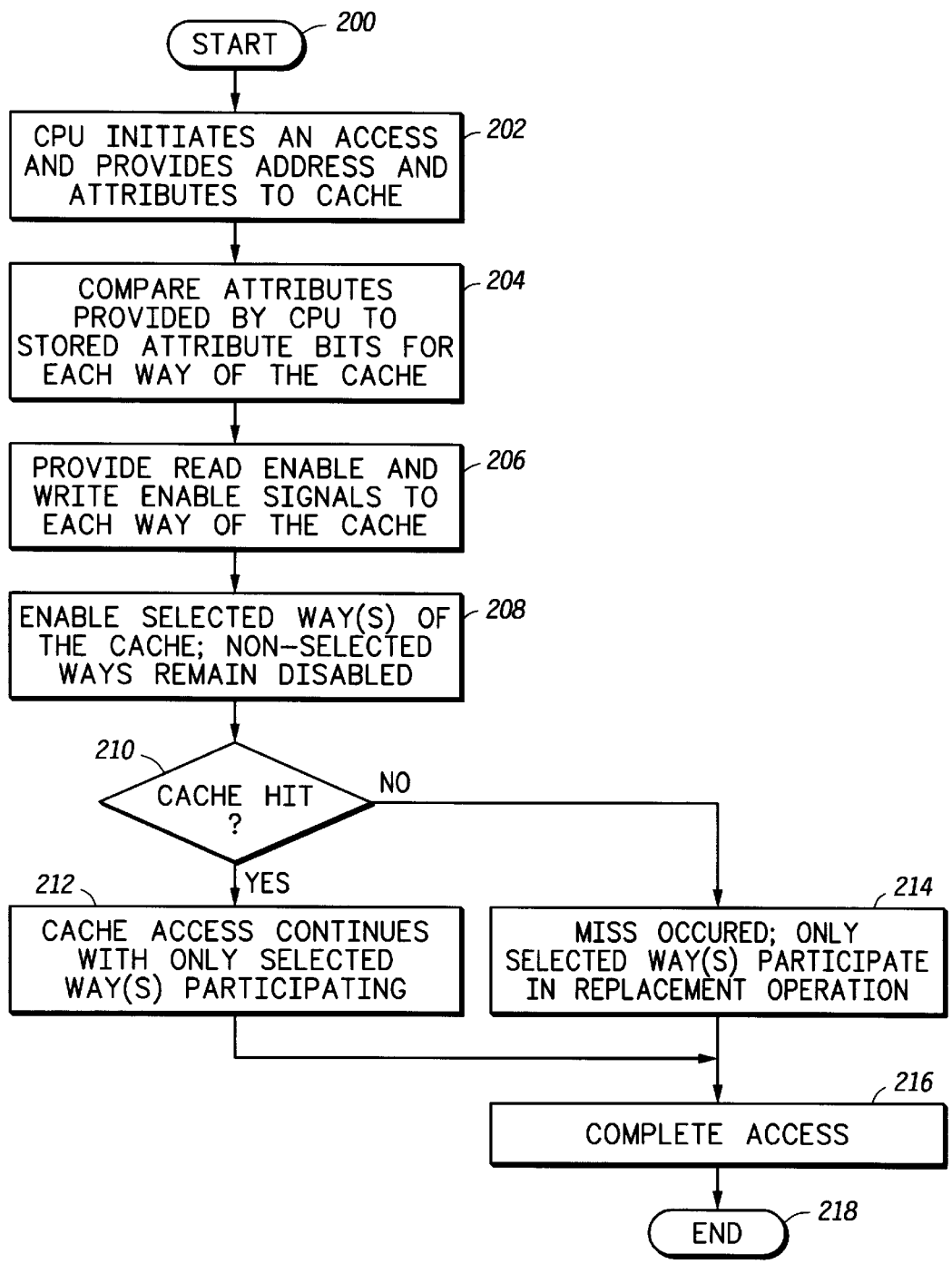
FIG. 5 is a flow chart that illustrates access operation of the cache of FIG. 2 using the register of FIG. 4.

Referring to FIG. 5, a particular method of operating the data processing system 10 having a multi-way cache is illustrated. The method includes a first step, step 202, of initiating an access, such as a memory access, where address and attribute information is provided to a multi-way cache. At step 204, the provided attribute information is compared to stored attribute control bits for each way of the multi-way cache. These stored attribute control bits may be the control bits stored in the register 80 as described above. Based on the above comparison, enable signals, such as read enable and write enable signals, are provided for each way of the multi-way cache, at step 206. Selected ways of the cache are enabled based on the enable signals while non-selected ways remain disabled., step 208.

When accessing the cache, if there is a cache hit, step 210, the cache access continues with only the selected cache ways participating, step 212. In addition, a replacement function is used to determine a cache entry to be replaced in a subsequent replacement operation. The replacement function is only affected by the selected ways of the multi-way cache. In the event of a cache miss, only the selected cache ways participate in a replacement operation, step 214. As a specific example, only the selected cache ways are available for replacement of existing blocks with the data block from external memory corresponding to the appropriate access operation. The access operation is then completed, step 216.

The above multi-way cache apparatus and method has many benefits. For example, in certain processing applications, cache efficiency may be increased by providing higher allocation to certain data class types that are more often used by such application. For example, in certain applications, a higher percentage of instruction type data is accessed for processing and would therefore benefit from a higher cached usage. By allowing selective allocation of cache resources on a multi way basis, such preferred cache allocation can be allotted. In addition, since individual cache ways may be de-selected for particular data class types, power savings result from non-use of associated power consuming circuitry for the non-selected cache ways. Such conservation of power dissipation may be especially useful in many low power usage applications, such as in low power handled devices.

Thus, there has been described herein an embodiment including at least one preferred embodiment of an improved multi-way cache apparatus and method of operating a data processing system. It will be apparent to those skilled in the art that the disclosed subject matter may be modified in numerous ways and may assume many embodiments other than the preferred form specifically set out and described above. Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

What is claimed is:

1. A method for operating a data processing system having a multi-way cache, the method comprising:

initiating an access operation;

accessing the multi-way cache in response to the access operation, wherein accessing comprises:

providing a provided access attribute to the multi-way cache as part of the access operation;

comparing the provided access attribute with a first stored access attribute that corresponds to a first way of the multi-way cache;

comparing the provided access attribute with a second stored access attribute that corresponds to a second way of the multi-way cache;

selectively enabling the first way of the multi-way cache based on whether the provided access attribute matches the first stored access attribute; and selectively enabling the second way of the multi-way cache based on whether the provided access attribute matches the second stored access attribute, and wherein selectively enabling the first way and selectively enabling the second way is performed prior to determining if one of a cache miss and a cache hit has occurred during the access operation.

2. A method as in claim 1, further comprising a step of:
continuing the access operation with only ways of the multi-way cache that have been selectively enabled.

3. A method as in claim 1, further comprising a step of:
storing the first stored access attribute and the second stored access attribute in a plurality of user programmable register bits.

4. A method as in claim 1, wherein the provided access attribute, the first stored access attribute, and the second stored access attribute is each an instruction/data attribute.

5. A method as in claim 1, wherein the provided access attribute, the first stored access attribute, and the second stored access attribute is each a supervisor/user attribute.

6. A method as in claims 1, further comprising:
determining if the cache miss has occurred during the access operation; and
if the cache miss has occurred, performing a replacement operation using only ways of the multi-way cache that have been selectively enabled during the access operation.

7. A method as in claim 1, further comprising:
determining if the cache hit has occurred during the access operation;
if the cache hit has occurred, allowing only selected ways of the multi-way cache to participate in a replacement function.

8. A method as in claim 1, wherein said step of selectively enabling the first way of the multi-way cache comprises steps of:
selectively providing a first read enable signal to the first way of the multiway cache; and
selectively providing a first write enable signal to the first way of the multi-way cache.

9. A method as in claim 8, wherein said step of selectively enabling the second way of the multi-way cache comprises steps of:
selectively providing a second read enable signal to the second way of the multi-way cache; and
selectively providing a second write enable signal to the second way of the multi-way cache.

10. A method as in claim 1, wherein said step of providing the provided access attribute to the multi-way cache comprises step of generating the provided access attribute.

11. A method as in claim 10, wherein the provided access attribute is generated within the multi-way cache.

12. A method as in claim 10, wherein the provided access attribute is generated within a central processing unit.

13. A method as in claim 1, further comprising steps of:
selectively flushing the first way of the multi-way cache based on whether the provided access attribute matches the first stored access attribute; and
selectively flushing the second way of the multi-way cache based on whether the provided access attribute matches the second stored access attribute.

14. A method as in claim 1, further comprising steps of:
providing a second provided access attribute to the multi-way cache as part of the access operation;
comparing the second provided access attribute with a third stored access attribute that corresponds to the first way of the multi-way cache;
comparing the second provided access attribute with a fourth stored access attribute that corresponds to the second way of the multi-way cache;
selectively enabling the first way of the multi-way cache based on whether the provided access attribute matches the first stored access attribute and the second provided access attribute matches the third stored access attribute; and selectively enabling the second way of the multi-way cache based on whether the provided access attribute matches the second stored access attribute and the second provided access attribute matches the fourth stored access attribute.

15. An integrated circuit comprising:

a cache having a first way and a second way;

a first storage element for storing a first stored attribute for the first way of the cache;

a second storage element for storing a second stored attribute for the second way of the cache;

a conductor for transferring an access attribute; and control circuitry which compares the access attribute to the first stored attribute to provide a first comparison result and which selectively enables the first way of the cache based on the first comparison result, and which compares the access attribute to the second stored attribute to provide a second comparison result and which selectively enables the second way of the cache based on the second comparison result wherein the control circuitry selectively enables the first way of the cache and selectively enables the second way of the cache prior to determining if one of a cache hit and a cache miss has occurred.

16. An integrated circuit as in claim 15, wherein said first storage element comprises first user programmable register bits and wherein said second storage element comprises second user programmable register bits.

17. An integrated circuit as in claim 15, further comprising:

a first way read enable signal generated by said control circuitry, said first way read enable signal selectively enabling the first way of the cache for a read access; and a second way read enable signal generated by said control circuitry, said second way read enable signal selectively enabling the second way of the cache for the read access.

18. An integrated circuit as in claim 17, further comprising:

a first way write enable signal generated by said control circuitry, said first way write enable signal selectively enabling the first way of the cache for a write access; and a second way write enable signal generated by said control circuitry, said second way write enable signal selectively enabling the second way of the cache for the write access.

19. An integrated circuit as in claim 15, wherein the first way of the cache comprises:

a first tag portion; and a first data portion;

and wherein the second way of the cache comprises:

a second tag portion; and a second data portion.

20. An integrated circuit as in claim 15, wherein the access attribute, the first stored attribute, and the second stored attribute is each an instruction/data attribute.

21. An integrated circuit as in claim 15, wherein the access attribute, the first stored attribute, and the second stored attribute is each an supervisor/user attribute.

22. An apparatus having a multi-way cache, comprising:

a first user controllable element having a predetermined first attribute corresponding to a first way of the multi-way cache;

a second user controllable element having a predetermined second attribute corresponding to a second way of the multi-way cache;

a conductor for transferring an access attribute to the multi-way cache;

first compare circuitry which compares the access attribute to the predetermined first attribute to provide a first comparison result;

second compare circuitry which compares the access attribute to the predetermined second attribute to provide a second comparison result;

first way control circuitry for selectively enabling the first way of the multi-way cache based on the first comparison result; and second way control circuitry for selectively enabling the second way of the multi-way cache based on the second comparison result;

first way control circuitry for selectively enabling the first way of the multi-way cache based on the first comparison result; and second way control circuitry for selectively enabling the second way of the multi-way cache based on the second comparison result, wherein the first way control circuitry selectively enables the first way and the second way control circuitry selectively enables the second way prior to the apparatus determining if one of a cache hit and a cache miss, corresponding to the access operation, has occured.

* * * * *

UNITED STATES PATENT AND TRADEMARK OFFICE
CERTIFICATE OF CORRECTION

PATENT NO. : 6,185,657 B1
DATED : February 6, 2001
INVENTOR(S) : William C. Moyer It is certified that error appears in the above-identified patent and that said Letters Patent is hereby corrected as shown below:

Column 5, claim 1,
Line 45, after "having" add -- a memory and --.
Line 47, replace "an" with -- a memory --.

Column 7, claim 14,
Line 1, after "and" add -- selectively enabling the first way of the multi-way cache based on whether --.
Line 6, after "and" add -- selectively enabling the second way of the multi-way cache based on whether --.

Column 7, claim 15,
Line 15, after "attribute" add -- corresponding to a memory access operation --.
Line 23, after "result" add -- , --.
Line 27, after "miss" add --, corresponding to the access operation, --.

Column 8, claim 22,
Line 23, after "attribute" add -- corresponding to a memory access operation --.
Lines 32 through lines 37, delete "first way control circuitry for selectively enabling the first way of the multi-way cache based on the first comparison result; and second way control circuitry for selectively enabling the second way of the multi-way cache based on the second comparison result;".

Signed and Sealed this

Twenty-fifth Day of December, 2001

*Attest:*

*Attesting Officer*

JAMES E. ROGAN
*Director of the United States Patent and Trademark Office*